United States Patent
Rhoads et al.

[11] Patent Number: 5,896,653
[45] Date of Patent: Apr. 27, 1999

[54] PORTABLE D.C. POWER ELECTRO-CHEMICAL ETCHING TOOL AND METHOD

[75] Inventors: Carl R. Rhoads, Rosamond; Michael H. Granneman; Kelly G. Ralston, both of Lancaster, all of Calif.

[73] Assignee: Northrop Grumman Corporation, Los Angeles, Calif.

[21] Appl. No.: 08/893,009

[22] Filed: Jul. 15, 1997

[51] Int. Cl.$^6$ .............. H01R 43/00; C25F 3/02; C25F 7/00; H01M 2/10

[52] U.S. Cl. ............ 29/855; 204/224 M; 204/271; 429/99; 429/100

[58] Field of Search .............. 204/224 M, 271; 205/640; 29/855, 730; 429/99–100

[56] References Cited

U.S. PATENT DOCUMENTS

| | | | |
|---|---|---|---|
| 3,325,384 | 6/1967 | Frantzen | 204/224 R X |
| 3,346,477 | 10/1967 | Wolfer | 204/224 R |
| 3,861,981 | 1/1975 | Loo | 156/345 |
| 4,495,045 | 1/1985 | Jackson | 204/271 X |
| 5,322,613 | 6/1994 | Ohira | 204/271 X |
| 5,489,486 | 2/1996 | Glover | 429/100 |

*Primary Examiner*—Donald R. Valentine
*Attorney, Agent, or Firm*—Terry J. Anderson; Karl J. Hoch, Jr.

[57] ABSTRACT

A low voltage, low current power supply and chemical etching tool includes a container and a D.C. voltage source sealed within the container. The D.C. voltage source may be one or more batteries that together generate less than 18 volts and 1.7 amps. Electrical leads are connected to the D.C voltage source, and lead from the container through openings in the container cap. The electrical leads have no splices external to the container. The openings through which the electrical leads pass are sealed. One of the electrical leads is connected to an electro-chemical etching head. The other electrical lead is connected to a connecting clip to be attached to the part to be marked by the etching process.

15 Claims, 1 Drawing Sheet

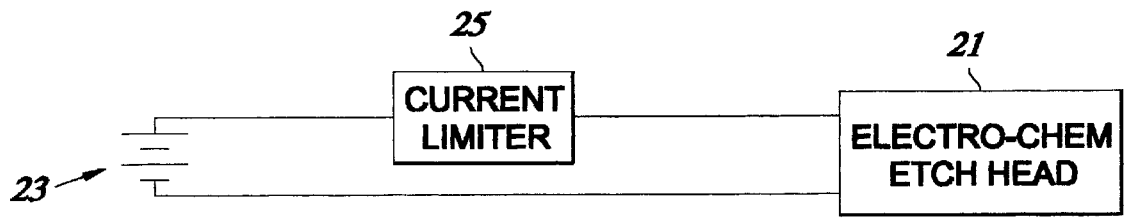
Fig. 1
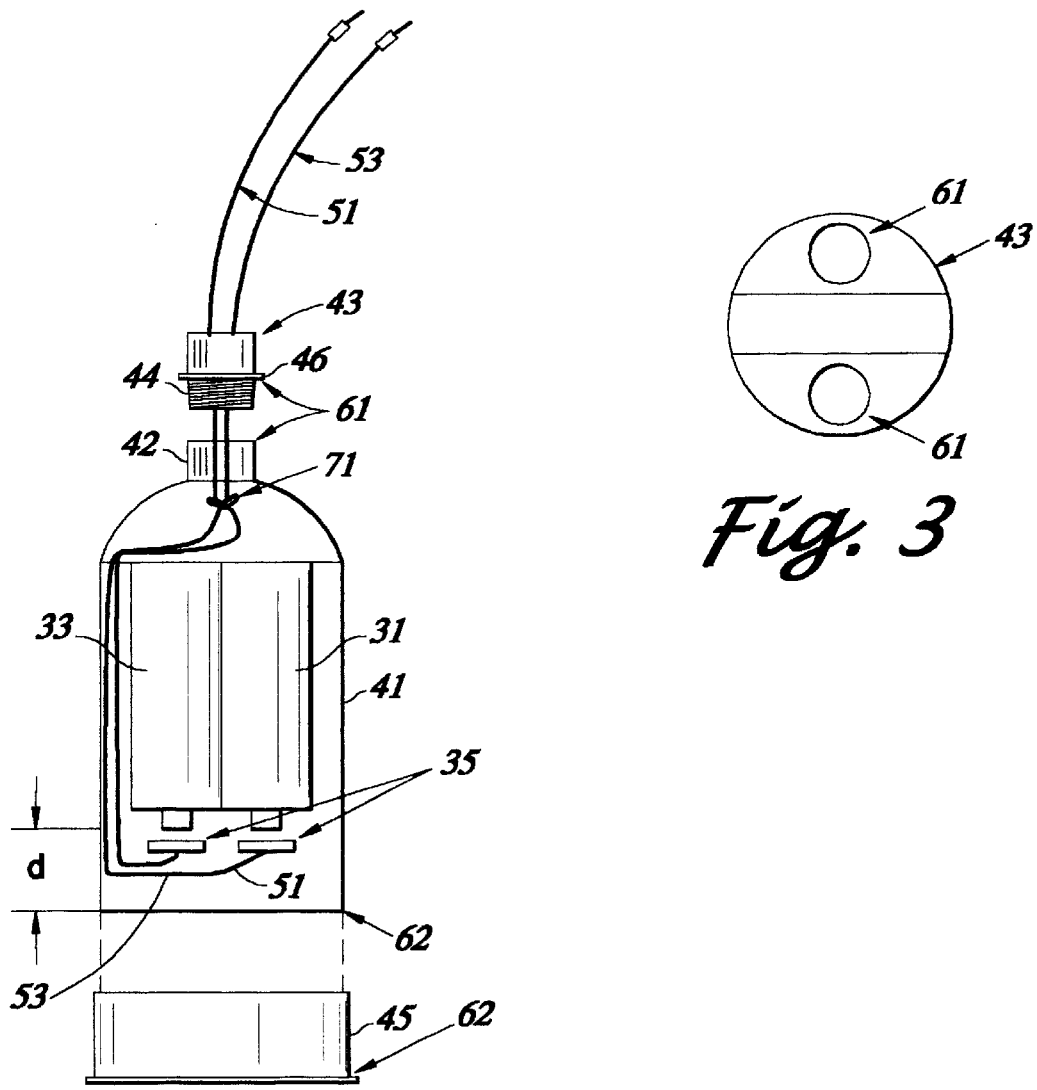
Fig. 3
Fig. 2

//5,896,653//

PORTABLE D.C. POWER ELECTRO-CHEMICAL ETCHING TOOL AND METHOD

The Government has rights in this invention pursuant to contract F33657-81-C-0067 awarded by the United States Air Force.

BACKGROUND OF THE INVENTION

The present invention relates to chemically etching surfaces, and particularly to etching specific marks onto a metal surface. Various applications require that metal surfaces be marked in some fashion. For example, to guide the placement of fittings such as cryo-fits in a tube or tank, the tube or tank surface must be marked in some fashion. These markings may be called witness markings. In addition, serial numbers or other identification marks may be required on parts or equipment.

Conventionally, the witness markings are applied using an electro-chemical etching tool. An electrolyte fluid is delivered to a chemical etching head along with a high voltage alternating current to etch the mark in the surface of the tube or tank. Typically the electro-chemical etching equipment is operated at 110 volts A.C., drawing about 15 amps of current. The chemical etching technique provides accurate and permanent marks.

One of the applications in which markings may be applied is in installing fittings in a fuel tank. The high voltage chemical etch equipment works well when the tank has not been used, or when it has been thoroughly cleared of fuel and fuel vapor. However, the presence of any fuel vapors may lead to explosive combustion at the slightest spark from the electro-chemical etching equipment. Thus there has been a need for a marking apparatus that has virtually no probability of igniting vapors in the environment in which the marking takes place.

Insulating the high voltage power supply of the electro-chemical etching tool improves the risk somewhat. However, the large voltage and current at the etching head still present a risk of explosion in an environment that includes volatile vapors. Existing electro-chemical etching apparatus still deliver approximately 5 amps of current at 18 volts D.C. to the marking head.

An ink marking may also be used in certain applications. However, ink markings tend not to be permanent, thus reducing their utility in certain applications.

SUMMARY OF THE INVENTION

The present invention provides a low voltage, low current power supply and chemical etching apparatus for use in an environment that may contain volatile vapors. The apparatus is further insulated to minimize the possibility of generating a spark.

The electro-chemical etching apparatus of the invention includes a container and a D.C. voltage source sealed within the container. Preferably, the D.C. voltage source is a pair of conventional 9 volt batteries connected in series. Electrical leads are connected to the D.C. voltage source, and lead from the container. The container is sealed around the electrical leads. An electro-chemical etching head is connected to the other end of one of the electrical leads, such as the negative lead The other end of the other lead (the positive lead) is connected to a removable connector, such as an alligator-type clip.

The electrical leads have no splices external to the container, and each electrical lead is fully insulated external to the container.

The container may be a tubular container having a top cap and a bottom cap. The electrical leads pass through openings in the top cap. Preferably, the joint between the top cap and the container are sealed to prevent the passage of moisture or vapors into the container.

It is an object of the invention to provide chemical etching apparatus that can be used in environment containing volatile vapors.

It is an object of the invention to provide an electro-chemical etching apparatus having a reduced possibility of causing an explosion due to sparking.

It is an object of the invention to provide a low voltage chemical etching apparatus for marking.

It is an object of the invention to provide a low current chemical etching apparatus for marking.

It is a further object of the invention to provide a power supply for a chemical etching apparatus that is virtually completely insulated.

These and other advantages of the invention will become apparent from the following description of a particular embodiment of the invention, including the accompanying illustrations.

BRIEF DESCRIPTION OF THE DRAWINGS

FIG. 1 is a schematic diagram of an electrical chemical etching apparatus incorporating an embodiment of the invention;

FIG. 2 is a drawing, partially in cross-section of a particular embodiment of a chemical etching apparatus power supply structured in accordance with the invention; and FIG. 3 is a top plan view of the top cap of the power supply embodiment shown in FIG. 2.

DETAILED DESCRIPTION OF THE PREFERRED EMBODIMENTS

FIG. 1 shows an electro-chemical etching apparatus constructed in accordance with the present invention. Electro-chemical etching apparatus includes an electro-chemical etching head, or electro-chem etch head 21. This electro-chem etch head may be a conventional marking head from a standard chemical etching tool kit, such as the head from a Mark 300 model chem-etch tool manufactured by Marking Methods, Inc.

As is understood by those skilled in the art, an electrolyte fluid is applied to the marking head 21 so that the witness mark nay be electrochemically etched on the metal surface.

The electrochemical etching is driven by a D.C. voltage source 23. The D.C. voltage source is preferably a battery.

When the chemical etching is to take place in a hazardous environment containing volatile fluids or vapors, Underwriters Laboratory Standard Number 913, "Standard for Intrinsically Safe Apparatus and Associated Apparatus for Use in a Class I, II, III, Division I, Hazardous (classified) Locations" specifies the relatively safe current and voltage combination for use with particular fluids. The specific embodiment of the invention here is particularly applicable to applying marks in a fuel tank that may contain traces of oil I JP-5 fluids. According to U.L. 913, for such an environment, a system operating at 18 volts should have a current of less than about 1.75 amps to substantially eliminate the possibility of combustion or explosion.

Preferably, the D.C. voltage source 23 produces approximately 18 volts. In addition, the voltage source should produce a relatively low current, less than 2.2 amps. The current from the 18 volt voltage source should be less than 1.75 amps. To provide a margin of additional safety, the current should ideally be less than 1.0 amps.

One possibility for the D.C. voltage source 23 is to use a pair of conventional 9 volt batteries connected in series. The nine volt batteries may be, for example Ray-o-Vac model number AL-9V nine volt batteries connected in series. Such a power supply provides approximately 0.5 amps.

Referring now to FIG. 2, the D.C. voltage source is shown as a pair of 9 volt batteries 31, 33. The batteries are electrically connected in series in a conventional manner using conventional snap on electrical connections 35.

The batteries 31, 33 are contained within a container or capsule 41. The container maybe a plastic tube. In the illustrated embodiment, the top portion of the capsule tapers to its top opening 42. The container has a top cap 45 and a bottom cap. Preferably, the container is approximately one half inch longer than the batteries to provide room for the electrical connections between the batteries. This is shown as distance d in FIG. 2.

The top cap 43 fits into the opening 42 at the top of the container or capsule. In the illustrated embodiment, the top opening 42 in the container is threaded, and the top cap 43 has matching threads 44. The threads 44 and their mating threads in the top opening 42 of the top of the container are designed to minimize the passage of moisture between the exterior of the container and its interior. In addition a lip 46 on the cap abuts the top of the opening 42 when the top cap is fully installed, to also reduce the passage of moisture. The bottom cap may be a snap-on plastic cap.

Electrical connections are provided to the positive and negative terminals of the batteries 31, 33. In an embodiment in which two batteries are connected in series, a first electrical lead 51 is connected to the negative terminal of the first battery 31, through one of the electrical connectors 35. A second electrical lead is 53 connected to the positive terminal of the second battery 33 using another of the electrical connectors 35. The positive terminal of the first battery 31 is then connected directly to the negative terminal of the second battery 33 to provide the series connection between the two batteries. The electrical connectors 35 are conventional snap-on electrical connectors.

An opening is provided through the container so that the electrical leads may pass from the inside of the container to the outside of the container. As illustrated, in FIG. 3, two number 27 holes 61 are drilled through the top cap 43 so that each electrical lead may pass through one of the holes. The electrical leads are fully insulated external to the capsule, and do not contain any splices. A splice or connection in the electrical lead provides a point at which a spark may be generated.

The openings 61 around the leads are sealed with a shrink-wrap plastic material to prevent the passage of moisture such as fuel vapor from outside the container to the inside of the container.

Inside the top of the container, the electrical leads maybe knotted together, as with a square knot 71, to keep them from pulling. This will reduce the possibility of accidentally disconnecting the electrical leads from the battery terminals, as such disconnection may produce a spark. In addition, disconnecting the electrical leads from the power supply would interfere with the electrochemical etching process.

The bottom end cap 45 of the capsule snaps on and off. Preferably, it opens the entire bottom of the tubular container 41 for easy access to the batteries 31, 33 contained within the container.

The joint 61 between the top cap and the capsule should be sealed to prevent the passage of moisture between the outside of the container and the inside of the container. This may be accomplished by applying electrical tape around the joint.

Similarly, the joint 62 between the bottom end cap and the container should also be sealed against moisture. This also may be accomplished using electrical tape.

Alternatively, the joints between the caps and the container may be sealed with a shrink-wrap plastic. By completely sealing the battery within the capsule, the possibility of volatile vapors entering the battery component is virtually eliminated. Insulating the battery and its connections from the volatile vapors significantly reduces the possibility of combustion or explosion.

Ideally, no additional diodes, capacitors, or other devices are included in the circuit shown in FIG. 1. Such devices tend to increase the system complexity and increase the work energy to power consumption ratio. In addition, each electrical connection provides an additional point at which a spark may be produced.

The chemical etching head 21 is attached to the electrical lead 51 (the negative lead). The positive electrical lead 53 is attached to a connecting element, such as an alligator clip 22. The alligator clip 22 is attached to the part being marked in the etching process. The negative lead 51 with the etching head is then applied to the part being etched to complete the process. Because of the low voltage and current supply to the head by the device, there is little or no risk of any sparking at the head causing a fire or explosion.

While a preferred embodiment of the invention has been described herein, it will be appreciated that a number of modifications and variations will suggest themselves to those skilled in the pertinent arts. These variations and modifications that may suggest themselves should be considered within the spirit and scope of the present invention, as defined in the claims that follow.

What is claimed is:

1. An electro-chemical etching apparatus, comprising:
   a container sealed to substantially prevent the passage of moisture from outside the container to the interior of the container;
   a D.C. voltage source sealed within the container;
   electrical leads connected to the D.C. voltage source, and leading from the container, wherein the container is sealed around the electrical leads, said electrical leads having no external splices and being insulated external to the container;
   an electro-chemical etching head connected to one of the electrical leads; and
   a clip connected to the other of the electrical leads.

2. The electro-chemical etching apparatus of claim 1, wherein the D.C. voltage source is a battery.

3. The electro-chemical etching apparatus of claim 2, wherein the battery comprises two batteries connected in series.

4. The electro-chemical etching apparatus of claim 1, wherein the electro-chemical etching head connected to the negative electrical lead, and the clip is connected to the positive electrical lead.

5. A power supply for an electro-chemical etching apparatus, the power supply comprising:
   a capsule having an end cap and a top cap, the coupling of the top cap and the capsule defining a first joint, and the coupling of the end cap and the capsule defining a second joint, wherein the top cap has two openings through it;

two nine volt batteries connected in series and housed within the capsule;

a first electrical lead connected to the negative terminal of the first of the series-connected batteries, and leading through one opening in the top cap, wherein the first electrical lead has no splices external to the capsule, and is insulated external to the capsule; and a second electrical lead connected to the positive terminal of the second of the series-connected batteries, and leading through the other opening in the top cap, wherein the second electrical lead has no splices external to the capsule and is insulated external to the capsule;

wherein the openings through the cap, the first joint and the second joint are sealed to substantially prevent the passage of moisture from outside the capsule to the interior of the capsule.

6. The power supply of claim 5, wherein the capsule is approximately one half inch longer than the batteries.

7. The power supply of claim 5, wherein the top of the capsule is threaded, and the top cap is threaded with mating threads.

8. The power supply of claim 7, wherein the bottom cap is a snap-on cap.

9. The power supply of claim 5, wherein the first and second joints are sealed with tape.

10. The power supply of claim 10, wherein the first and second joints are sealed with shrink wrap plastic.

11. A method of assembling an electrical device the method comprising:

sealing a D.C. voltage source in a closed container; providing through one or more openings in the closed container electrical leads from the D.C. voltage source to an electro-chemical etching head;

sealing the container openings through which the electrical leads are provided; and supplying to the electro-chemical etching head an electrolyte fluid.

12. A method of assembling an electrical device the method comprising:

providing a tubular container having a top cap and a bottom cap;

forming a first and second holes in the top cap;

inserting a first insulated electrical lead through the first hole in the top cap;

inserting a second insulated electrical lead through the second hole in the top cap;

placing a battery in the container;

connecting the first electrical lead to the negative terminal of the battery;

connecting the second electrical lead to the positive terminal of the battery;

sealing a first and second holes in the top cap around the first and second electrical leads;

sealing a joint between the top cap and the tubular container; and sealing a second joint between the bottom cap and the tubular container.

13. The method of claim 12, wherein the battery comprises two batteries connected in series, and wherein:

the step of connecting the first electrical lead to the negative terminal of the battery comprises connecting the first electrical lead to the negative terminal of the first battery; and the step of connecting the second electrical lead to the positive terminal of the battery comprises connecting the second electrical lead to the positive terminal of the second battery.

14. The method of claim 12, wherein: the step of sealing the first joint between the top cap and the tubular container comprises wrapping the first joint with tape; and the step of sealing the second joint between the bottom cap and the tubular container comprises wrapping the second joint with tape.

15. The method of claim 12, wherein:

the step of sealing the first joint between the top cap and the tubular container comprises wrapping the first joint with shrink wrap plastic; and the step of sealing the second joint between the bottom cap and the tubular container comprises wrapping the second joint with shrink wrap plastic.

* * * * *